Nov. 27, 1956

A. W. McDONALD 2,772,097

TRAILER STEPS

Filed March 2, 1954

INVENTOR
Albert W. McDonald
BY Nathan H. Kraus
Frank H. Marks

ATTORNEYS

United States Patent Office 2,772,097
Patented Nov. 27, 1956

2,772,097

TRAILER STEPS

Albert W. McDonald, St. Petersburg, Fla.

Application March 2, 1954, Serial No. 413,574

4 Claims. (Cl. 280—166)

My invention relates to an improved step particularly adapted for use on automobile trailer vehicles, but of course suitable for other applications wherever the features of such a step may be desirable.

One of the objects of my invention is the provision of an improved trailer step slideably mounted between brackets for quick and easy shifting of the step into use or out-of-use position.

Another object of my invention is the provision, in a structure of the foregoing character, of roller bearings for affording easy translation of the step into use or out-of-use position.

A further object of my invention is the provision of an improved trailer step in which the step is moved to or from use or out-of-use position through a translatory motion thereby permitting the step to be employed in trailers or other structures having a minimum of clearance above the ground.

A still further object of my invention is the provision of an improved trailer step which is sturdy, durable, efficient in service and economical to manufacture.

Other and further objects and advantages of my invention will become apparent from the following description when considered in connection with the accompanying drawings in which:

Fig. 6 is a cross sectional view on an enlarged scale taken on line 6—6 of Fig. 1 with the tread in retracted position.

Figure 1:
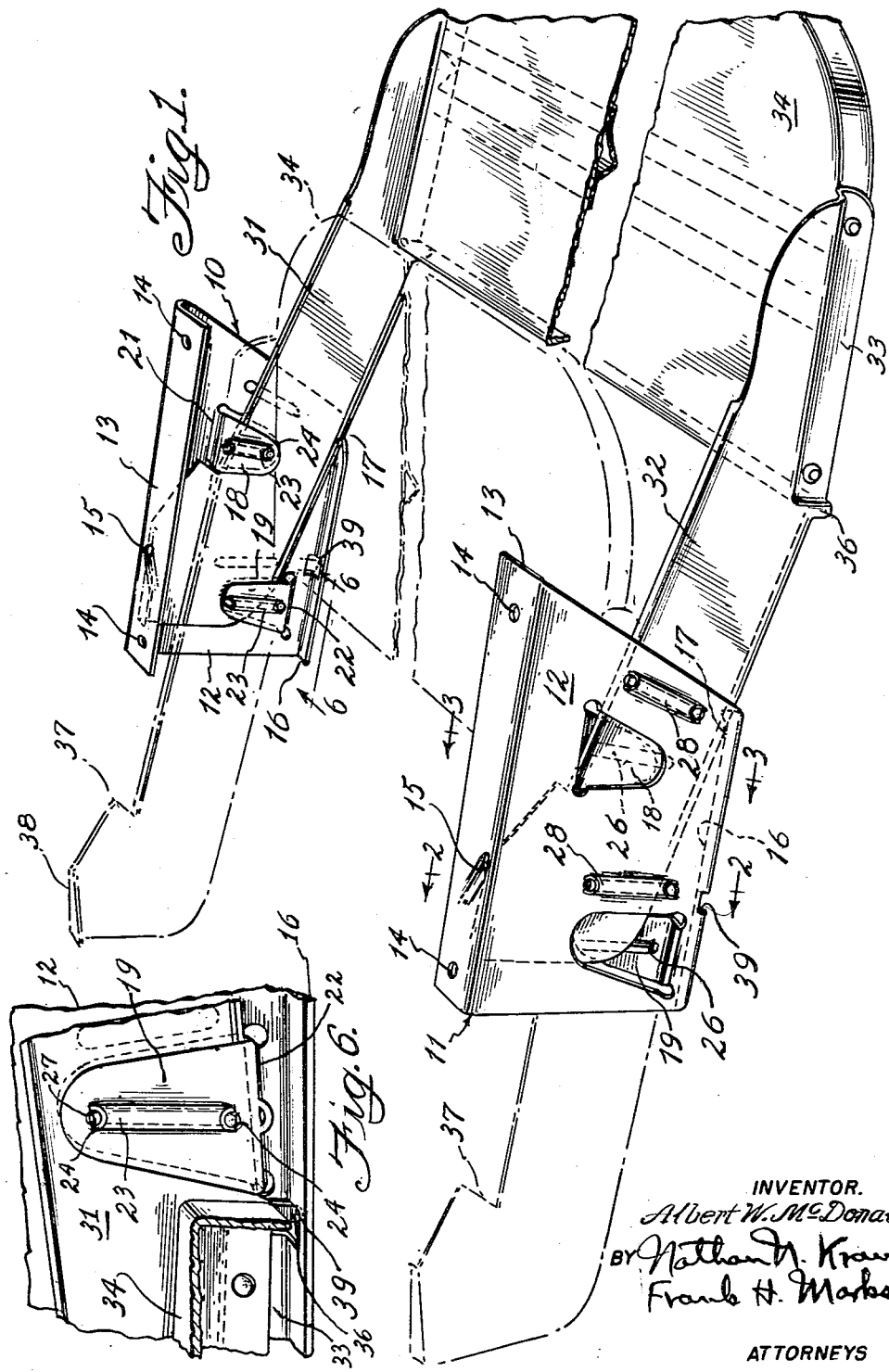
Fig. 1 is a perspective view of a trailer step constructed in accordance with my invention.
Figure 2:
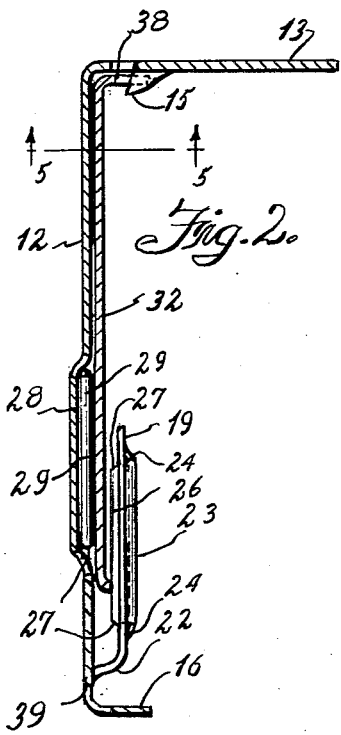
Fig. 2 is a cross sectional view on an enlarged scale taken substantially on line 2—2 of Fig. 1.
Figure 3:
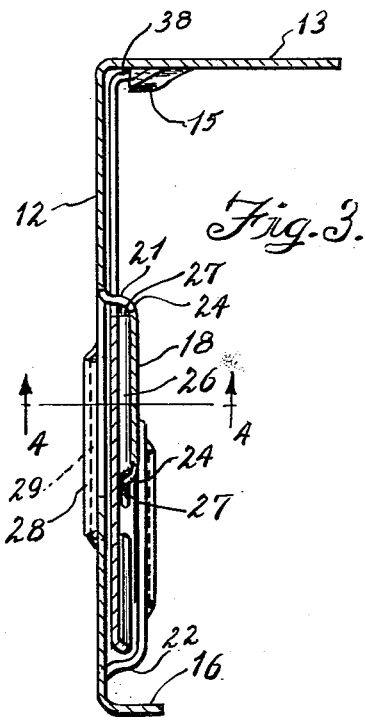
Fig. 3 is a cross sectional view on an enlarged scale taken substantially on line 3—3 of Fig. 1.

Referring to the drawings my invention comprises a pair of complemental brackets 10 and 11 shaped substantially as illustrated in Fig. 1. The said brackets are formed preferably of stamped sheet metal and each includes a wall portion 12 provided with a flange 13 along the top edge thereof, the said flange being perforated as at 14 to receive bolts or screws by which the bracket may be attached to the underside of a trailer. Additionally a lug 15 is struck out of the flange 13 and depends from the flange as illustrated in Figs. 2 and 3. Each of the brackets is provided with a flange 16 along the lower edge thereof, the forward edge 17 of said flange being bent upwardly for a purpose, as will be hereinafter explained. Struck out from the wall portion 12 of each of the brackets are forward and rearward lugs 18 and 19, respectively, which are offset but substantially parallel to the plane of the wall portion. As will be seen clearly by reference to Fig. 1 the lugs 18 and 19 are oppositely directed with the respective connecting portions 21 and 22 forming shoulders substantially parallel to each other. Each of the lugs 18 and 19 is stamped to provide a substantially semi-cyclindrical well 23, the ends of which are pierced providing openings 24. Received in each of said wells is a roller bearing 26 having reduced end portions 27 which are journaled in the pierced openings 24, thereby securing the roller bearing in each of said wells against inadvertent dislodgement. As will be clearly apparent by reference to Fig. 4, the roller bearings 26 extend slightly beyond the plane of the inner surface of a respective lug so as to insure contact with an arm hereinafter to be described.

Similar wells 28 are stamped in the bracket wall portion 12 each having its ends pierced to provide journal openings. One of said wells is disposed in close proximity to and forwardly of the forward lug 18 and the other of said wells being similarly disposed in relation to the rearward lug 19. A roller bearing 29 is received in each of wells 28 and likewise projects beyond the plane of the surface of the bracket wall 12.

Figure 4:
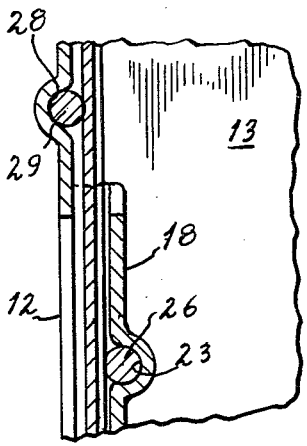
Fig. 4 is a cross sectional view taken on line 4—4 of Fig. 3
Figure 5:
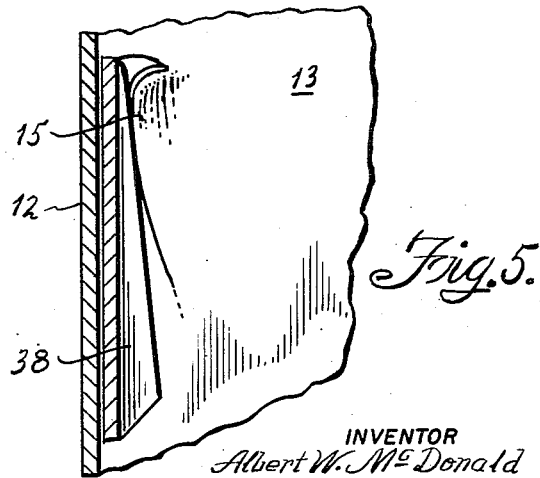
Fig. 5 is a cross sectional view taken on line 5—5 of Fig. 2.

As will be apparent by reference to Figs. 2, 3 and 4 two pairs of rollers in each bracket are arranged in confronting and spaced relation to each other so as to accommodate for sliding movement therebetween a supporting arm for the tread as will be presently described. The supporting arms 31 and 32 are preferably formed of sheet metal with the forward end of each having an inwardly offset portion 33 to which a metal tread 34 is suitably riveted. Adjacent the rear of the offset portion is a depending finger 36 integral with the arm. The rearward portion of each arm is provided with an upwardly extending shoulder 37. Along the top edge of the rearward portion of each arm is a lateral flange 38 which tapers forwardly as illustrated clearly in Figs. 1 and 5 for a purpose as will be hereinafter explained. The arms 31 and 32 are adapted to be received in the space between the lugs 18 and 19 and the bracket walls 12, the said lugs embracing opposite edge portions of the arms. The roller bearings 28 and 29 engage opposite surfaces of each arm and provide a substantially frictionless means which confine the arm against lateral movement while yet permitting free and easy longitudinal sliding of the arm relative to the bracket.

In operative or in-use position, the arms 31 and 32 and tread 34 are in the relation illustrated in Fig. 1 with the arms being extended to their maximum position and the shoulders 37 of each providing abutments engaging the connecting portions 21 of the lugs for limiting the forward movement of the arms. Additionally the flange 38 of each arm is caused to abut the underside of the flange 13 of each bracket with the flange wedged into the space between the lug 15 and the bracket wall 12. The lower edge of each arm 31 or 32 is supported by the forward edge 17 of the flange of the bracket. This edge portion functions as a fulcrum for the arm. The forward portions of the flanges 16 which are bent out of their normal plane serve as a retaining means to prevent lateral movement of the lower marginal edge portions of the arms 31 and 32 thereby insuring a more rigid structure. In the operative position the arms 31 and 32 assume a downwardly inclined direction with the tread 34 substantially horizontal.

In order to move the step to retracted position it is merely required that an operator push the tread 34 rearwardly. In such movement, the rounded lower edge of the depending finger 36 serves as a cam when it engages with the forward edge of the lower flange 16 of the bracket causing the arms 31 and 32 and tread 34 to be elevated with the depending finger 36 riding on the upper surface of the lower flange 16. This relationship is maintained until the finger 36 is caused to drop into the slot 39 provided in the flange 16 thereby effecting a locking action of the arms and tread in retracted position. The weight of the arms and tread when the same are in retracted position serves to normally prevent the step from being inadvertently dislodged.

In order to move the step to in-use position it is merely necessary to engage the forward edge of the tread 34 as with a foot and tip the same upwardly which movement causes the finger 36 to rise out of the slot 39 permitting the arms and tread to be drawn forwardly to the in-use position just described.

Various changes coming within the spirit of my invention may suggest themselves to those skilled in the art. Hence I do not wish to be limited to the specific embodiments described or uses mentioned, but intend the same to be merely exemplary, the scope of my invention being limited only by the appended claims.

I claim:

1. A trailer step structure comprising a pair of brackets adapted to be secured to the underside of a trailer in spaced relation, each bracket being of channel form in cross section and having upper and lower horizontal flanges and a vertical web connecting the flanges, each web having a lug struck out from the plane thereof, each lug including a vertical section in a plane spaced inwardly and parallel to said web, the vertical section being connected at the top to said web by a horizontal section, a sheet metal arm slideably mounted between each web and the vertical section of each lug, the upper edge of each arm having a shoulder formed therein and an elongated bearing surface spaced rearwardly thereof, said shoulder being arranged to engage the horizontal section of its associated lug and the bearing surface being arranged to engage the upper flange of its associated bracket when the arms are extended outwardly, and a step tread secured to said arms.

2. A trailer step structure comprising a pair of brackets adapted to be secured to the underside of a trailer in spaced relation, each bracket being of channel form in cross section and having upper and lower horizontal flanges and a vertical web connecting the flanges, each web having forward and rearward lugs struck out from the plane thereof, each forward lug including a vertical section in a plane spaced inwardly from and parallel to the web, the vertical section being connected at the top to the web by a horizontal section, each rearward lug including a vertical section in a plane spaced inwardly from and parallel to the web, the vertical section being connected at the bottom by a horizontal section, a sheet metal arm slideably mounted between each web and the vertical sections of respective forward and rearward lugs, the upper edge of each arm having a shoulder formed therein and an elongated bearing surface spaced rearwardly thereof, said shoulder being arranged to engage the horizontal section of its associated forward lug and the bearing surface being arranged to engage the upper flange of its associated bracket when the arms are extended outwardly, and a step tread secured to said arms.

3. The invention as defined in claim 1, in which the bearing surface comprises a lateral flange integral with the arm.

4. The invention as defined in claim 1, in which an abutment is provided on the underside of said upper flange and spaced from said vertical web and the bearing comprises a lateral flange integral with the arm, the flange being substantially wedge-shaped and being adapted to enter into the space between the abutment and the web when the arm is extended outwardly.

References Cited in the file of this patent

UNITED STATES PATENTS

| Number | Name | Date |
|---|---|---|
| 200,514 | Cristy et al. | Feb. 19, 1878 |
| 619,800 | Spink | Feb. 21, 1899 |
| 830,867 | Watson | Sept. 11, 1906 |
| 1,011,750 | Condos | Dec. 12, 1911 |
| 2,153,945 | Thelander | Apr. 11, 1939 |
| 2,209,576 | McDonald | July 30, 1940 |
| 2,533,050 | Runyen | Dec. 5, 1950 |
| 2,659,902 | Fitzgerald et al. | Nov. 24, 1953 |